(12) United States Patent
Nissov et al.

(10) Patent No.: US 6,396,624 B1
(45) Date of Patent: May 28, 2002

(54) EXTENDED BAND ERBIUM DOPED FIBER AMPLIFIER

(75) Inventors: Morten Nissov, Holmdel; Bo Pedersen, Rumson, both of NJ (US)

(73) Assignee: TyCom (US) Inc., Morristown, NJ (US)

(*) Notice: Subject to any disclaimer, the term of this patent is extended or adjusted under 35 U.S.C. 154(b) by 0 days.

(21) Appl. No.: 09/480,255

(22) Filed: Jan. 11, 2000

(51) Int. Cl.$^7$ .................................................. H01S 3/00
(52) U.S. Cl. .................................. 359/341.1; 359/337.2
(58) Field of Search ............................. 359/194, 337.4, 359/334, 341.3, 341.4

(56) References Cited

U.S. PATENT DOCUMENTS 5,822,113 A * 10/1998 Delavaux et al. ............ 359/341
5,920,424 A * 7/1999 Espindola et al. ........... 359/341
6,141,142 A * 10/2000 Espindola et al. ........... 359/341

OTHER PUBLICATIONS

Desurvire et al. "High–gain erbium–doped traveling–wave fiber amplifier", Optics Letters, vol. 12, No. 11, Nov. 1987, pp. 447–449.*

Wysocki et al. "Broad–Band Erbium–Doped Fiber Amplifier Flattened Beyond 40 nm Using Long–Period Fiber Grating Filter", IEEE Photonics Technology Letters, vol. 9, No. 10, Oct. 1997, pp. 1343–1345.*

Kean et al., "Pump induced inhomogeneity of gain spectra in conventional and extended–band EDFAs", Optical Fiber Communications Conference 1999, Feb. 21–26, 1999, vol. 2, pp. 10–12.*

Espindola et al., "Low noise, high gain, high conversion efficiency L–Band EDFA", OSA Trends in Optics and Photonics on Optical Amplifiers and their Ampplications. vol. 30, pp. 132–135, 1999.*

Cordina et al., "Ultra Low Noise Long Wavelenght EDFA with 3.6dB External Noise Figure", Optical Fiber Communication Conference, 1999. Feb. 21–26, 1999, vol. 2, pp. 13–15.*

Park et al., "Doped Fibre Lenght and pump power of gain–flattened EDFAs", Electronics Letters, Nov. 7, 1996, pp. 2161–2162.*

* cited by examiner

*Primary Examiner*—Thomas H. Tarcza
*Assistant Examiner*—Deandra M. Hughes

(57) ABSTRACT

An optical amplifier includes first, second and third amplifier stages, a first equalizer coupled between the first and second amplifier stages, a second equalizer coupled between the second and third amplifier stages, and a third equalizer coupled between an amplifier output and the third amplifier stage. The first stage includes a length of first erbium doped fiber coupled between an input and the first equalizer. The second stage includes a second erbium doped fiber coupled between the first equalizer and the second equalizer. The third stage includes a third erbium doped fiber coupled between the second equalizer and the third equalizer.

12 Claims, 4 Drawing Sheets

EXTENDED BAND ERBIUM DOPED FIBER AMPLIFIER

BACKGROUND OF THE INVENTION

1. Field of the Invention

The present invention relates to erbium doped fiber amplifiers. In particular, the invention relates to an arrangement of fiber amplifier segments with spectral equalizers between segments to provide extended bandwidth.

2. Description Of Related Art

Undersea communication network systems require repeaters periodically spaced to compensate for attenuation in the signal transmission medium. Optical fiber networks include repeaters connected between links of optical fiber cable. The optical fiber cables include one or more optical fibers and often include conductive wires (e.g., copper wires) to deliver power to the repeaters.

The repeaters are amplifiers. Older (regenerative) repeaters convert the input optical signal into an electrical signal which is amplified and then converted back to an output optical signal. However, most modern optical repeaters in lightwave transmission systems use optical amplifiers, and erbium doped fiber amplifiers (EDFA) have become the dominant technique for optical signal amplification. An EDFA includes a length of erbium doped fiber in which a lightwave propagates. An energy source or pump laser (e.g., an InGaAsP capped mesa buried heterostructure device) "pumps" the length of erbium doped fiber into an "excited" state. From this state, two consequences follow. First, signal gain is produced through emission stimulated by signal light passing through the "excited" fiber. Second, optical noise is produced through spontaneous decay of the "excited" state of the length of erbium doped fiber. The design of the fiber amplifier seeks to maximize the signal gain and minimize the optical noise produced while meeting the required power output and bandwidth specification.

It is desired to provide a wide band fiber amplifier to carry more information than can be carried by a narrow band amplifier. Known EDFAs have a bandwidth limit of about 40 to 45 nanometers over which the desired design specification and noise figure can be achieved. However, to achieve a wide band amplifier in excess of 40 to 45 nm, known wide band amplifiers have been realized by splitting the signal into two wavelength ranges. For example, the signal spectrum may be split into a first channel carrying a signal in a band from 1530–1560 nm and a second channel carrying a signal in a band from 1570–1610 nm. The first and second channels are amplified in respective EDFAs and then recombined on the amplifier's output fiber.

One known approach to achieve the band splitting and band recombination uses circulators together with extended band reflective filters. Another known approach to achieve the band splitting and band recombination uses wavelength division multiplexers. Using both techniques, but especially with the circulator design, the amplifier is limited by insertion loss problems, and the addition of a common stage of amplification is required in both first and second channels which adds to the complexity of the design and gain balancing between the channels. Using both techniques, the amplifier is limited by isolation problems. Multi-path interference generated by reflections from a point source or distributed sources arises when there is insufficient isolation between the amplifier components. Band splitting amplifiers also waste potential bandwidth in the guard band between the two channels that could otherwise be used to carry signals.

SUMMARY OF THE INVENTION

It is an object to the present invention to provide a wide band optical amplifier without a need for wavelength splitting equipment. It is another object to distribute the spectral gain equalization function between multiple erbium doped fiber amplifier stages.

These and other objects are achieved in an optical amplifier that includes first, second and third amplifier stages, a first equalizer coupled between the first and second amplifier stages, a second equalizer coupled between the second and third amplifier stages, and a third equalizer coupled between an amplifier output and the third amplifier stage. In another embodiment, the first stage includes a length of first erbium doped fiber coupled between an input and the first equalizer. The second stage includes a second erbium doped fiber coupled between the first equalizer and the second equalizer. The third stage includes a third erbium doped fiber coupled between the second equalizer and the third equalizer.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention uses a single band multi-stage amplifier to achieve a bandwidth of from 60 to 80 nm. This amplifier will be referred to as an extended band amplifier since normal erbium doped fiber amplifiers are generally limited to a 40 to 45 nm bandwidth over which a desired performance is achieved. Since all channels pass through the same piece of erbium doped fiber, no signal splitting devices are required. The invention includes plural equalizers distributed throughout the amplifier stages so as to distribute the gain equalization function. Each amplifier stage has an equalizer to equalize the gain response across the bandwidth of the amplifier. In this way the wide band operation can be achieved with realizable amounts of total pump power. The last stage can be operated without any pump power at all to achieve an optimal spectral performance.

Figure 1:
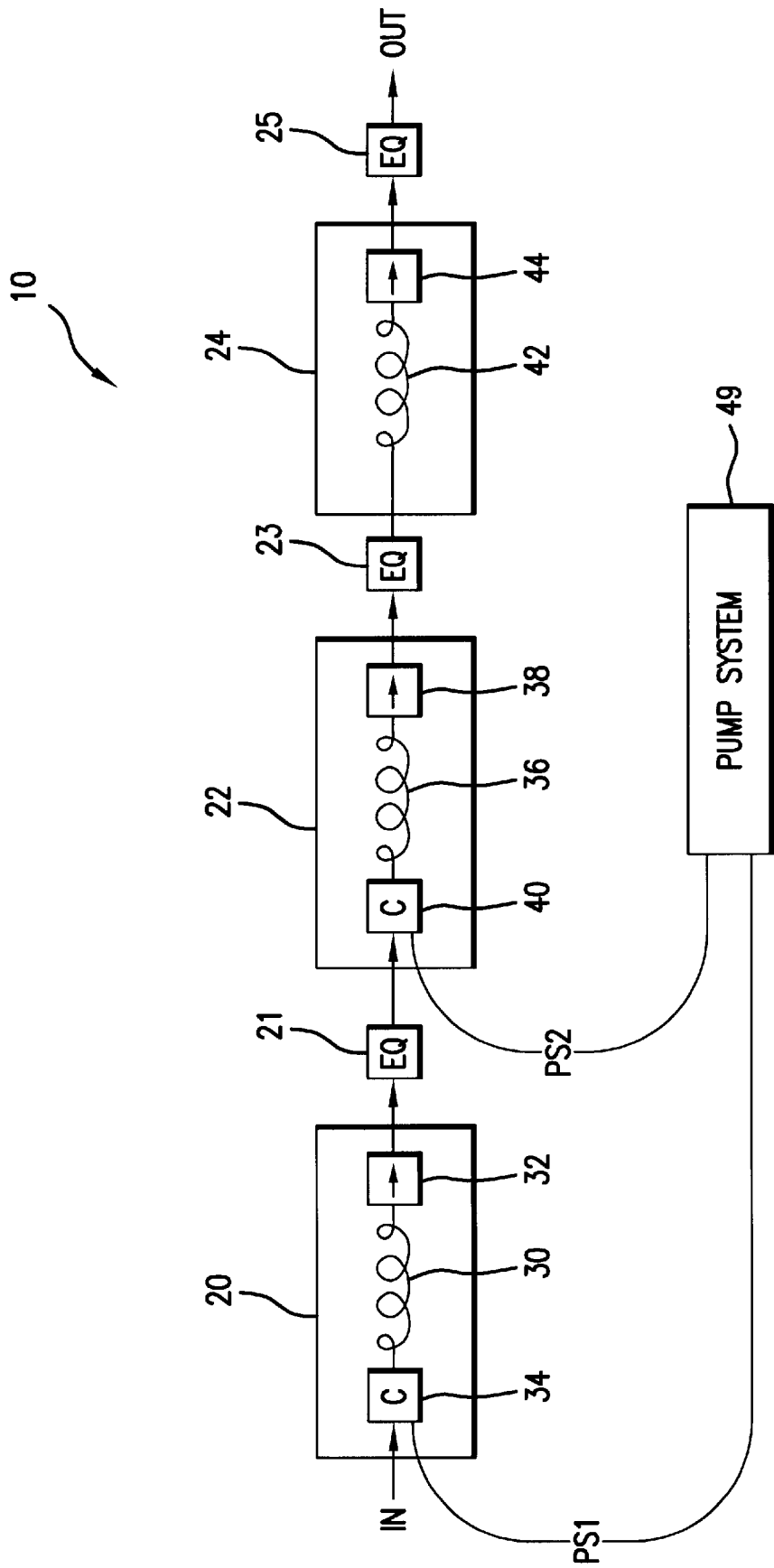
FIG. 1 is a schematic diagram of the optical amplifier of the invention.

In FIG. 1, optical amplifier 10 receives input signal IN and produces output signal OUT. Optical amplifier 10 includes first stage 20, second stage 22, third stage 24, first equalizer 21 coupled between the first and second stages, and second equalizer 23 coupled between the second and third stages. The equalizer is an optical component that equalizes an output spectral power density across a bandwidth. Optical amplifier 10 also includes third equalizer 25 coupled between an output of the optical amplifier and third stage 24.

First stage 20 includes a length (a 20 meter length in this example but the length generally depends on erbium type, operating point, etc.) of first erbium doped fiber 30 and optional first isolator 32. First isolator 32 is coupled between first equalizer 21 and first erbium doped fiber 30. The first erbium doped fiber is pumped with pump signal PSI from pump system 49 through coupler 34. In this example, pump signal PS1 is preferably a 480 milliwatt pump signal of a 980 nanometer wavelength that is coupled to the signal path through coupler 34. Pump signal PS1 is isolated from the desired signal by its wavelength. However, with or without the wavelength isolation, pump signal PS1 may be coupled to a terminal end of first erbium doped fiber 30, instead of a head end, so as to counter-propagate in a direction opposite to the direction of the desired signal.

Second stage 22 includes a length (a 20 meter length in this example) of second erbium doped fiber 36 and optional second isolator 38. Second isolator 38 is coupled between second equalizer 23 and second erbium doped fiber 36. The second erbium doped fiber is pumped with pump signal PS2 from pump system 49 through coupler 40. In this example, pump signal PS2 is preferably a 300 milliwatt pump signal of a 980 nanometer wavelength that is coupled to the signal path through coupler 40. Pump signal PS2 is isolated from the desired signal by its wavelength. However, with or without the wavelength isolation, pump signal PS2 may be coupled to a terminal end of second erbium doped fiber 36, instead of a head end, so as to counter-propagate in a direction opposite to the direction of the desired signal.

Third stage 24 includes a length (a 4.3 meter length in this example) of third erbium doped fiber 42 and optional third isolator 44 coupled between third equalizer 25 and third erbium doped fiber 42. Erbium doped fiber 42 in the final stage (i.e., third stage 24) is not optically pumped in this example but in general may be pumped. More stages and equalizers may advantageously follow third equalizer 25.

Improved wideband performance is achieved by distributing the spectral power equalization function over multiple erbium doped fiber amplifier stages.

Figure 2:
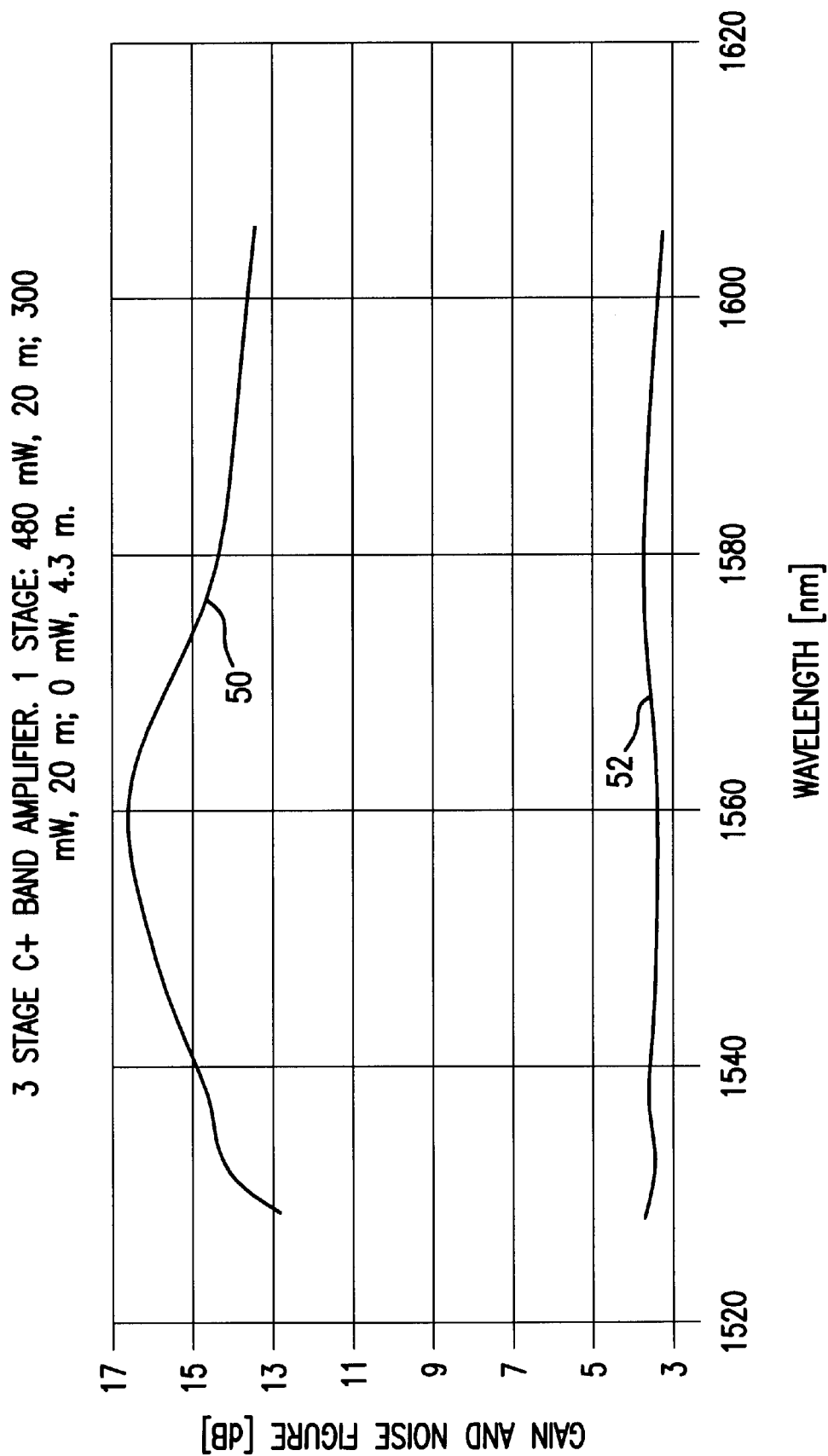
FIG. 2 is a graph showing the gain and noise figure performance of the amplifier of FIG. 1.

FIG. 2 is a graph showing the gain and noise figure performance (before final equalizer 25) of optical amplifier 10 depicted in FIG. 1. The three stages combine to provide a combination gain performance 50 that is greater than 13 dB and less than 17 dB with a noise FIG. 52 of less than 4 dB across a band from 1530 nanometers through 1610 nanometers when stimulated with an input signal that is characterized by a power of 0 dBm (1 milliwatt) distributed across the band. Third and final equalizer 25 is provided to flatten the spectral gain to be 13 dB everywhere across the band.

Figure 3:
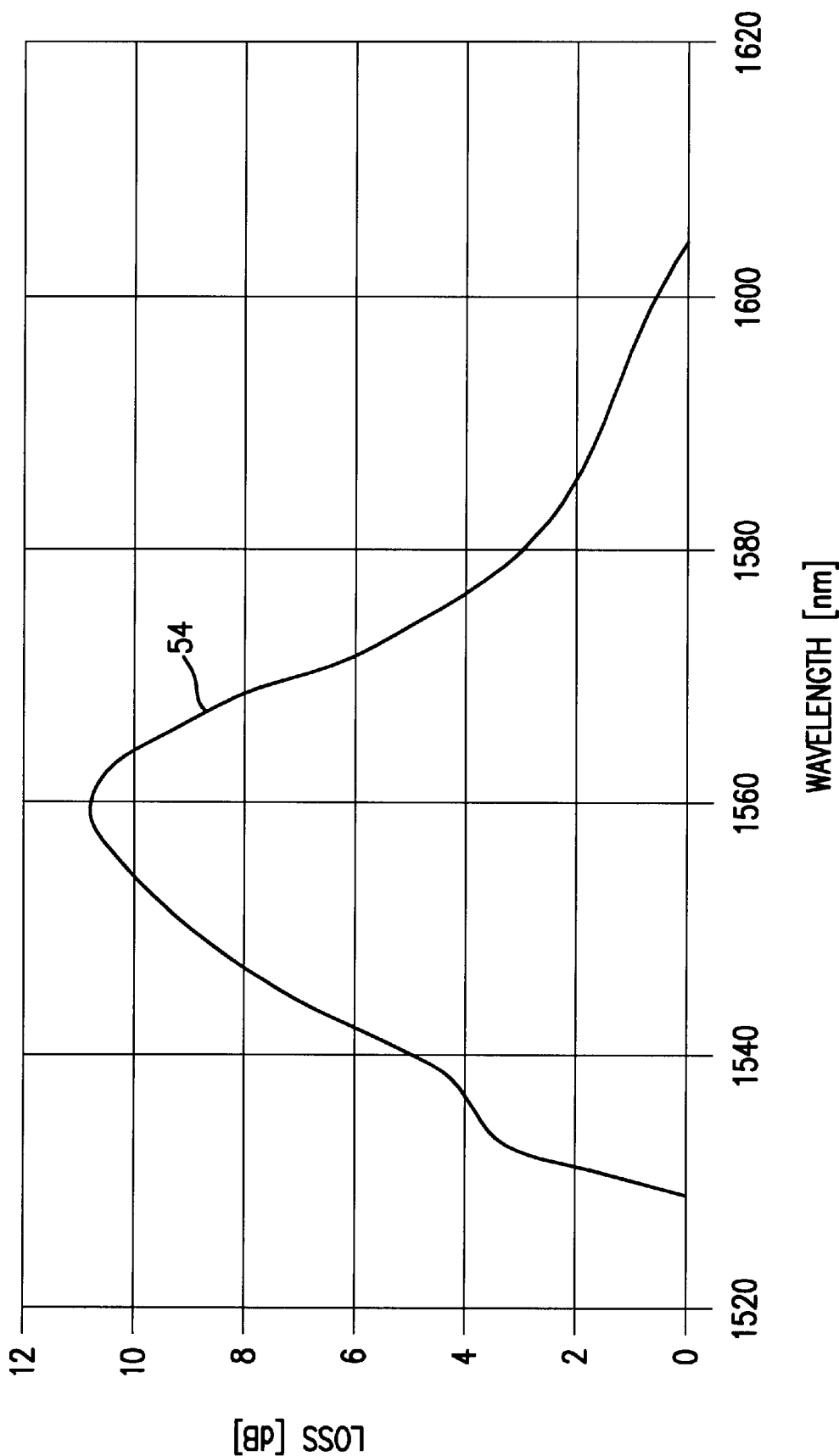
FIG. 3 is a graph showing the combined spectral insertion loss required of the two internal equalizers in the amplifier of FIG. 1.

FIG. 3 is a graph showing the combined insertion loss 54 spectra of the internal equalizers (equalizers 21 and 23). For extended band amplifiers as described herein the mid band gain (at about 1560 nm) of an EDFA is greater than the gain at the band extremes (either 1530 or 1610 nm). There is therefore a greater need to attenuate spectral power density in the mid band region than at the band extremes to achieve a near uniform spectral power density across the band at the end. Equalizers 21 and 23 provide this spectra dependent attenuation. The insertion loss 54 of each of equalizers 21 and 23 is depicted in FIG. 3.

Figure 4:
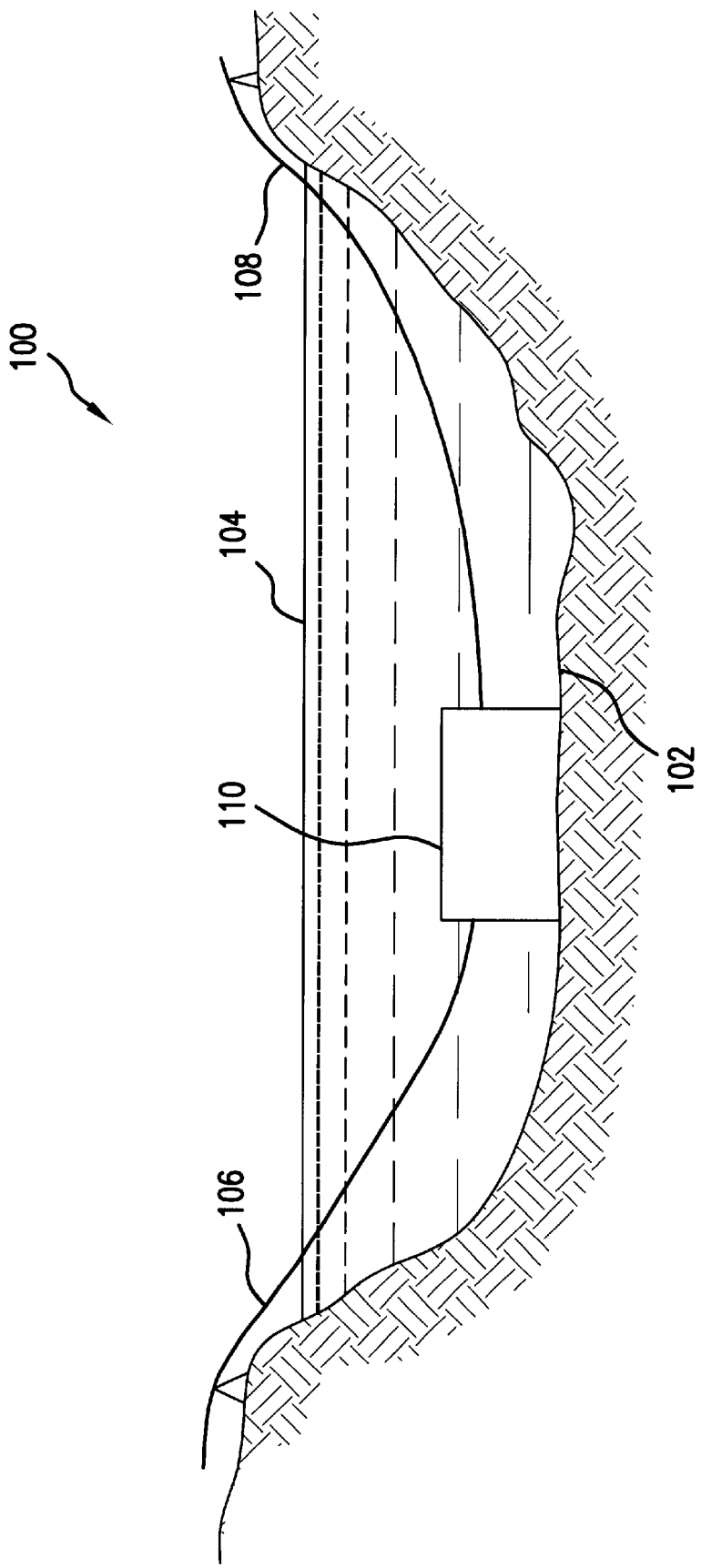
FIG. 4 is a schematic representation of a communication system using the amplifier of FIG. 1.

In FIG. 4, communications system 100 includes input optical transmission medium 106, output optical transmission medium 108, and optical amplifier 110 coupled therebetween. Plural stages in excess of three stages can be advantageously combined into an optical amplifier used in the communications system. Plural stages can be used to reduce the per stage attenuation requirements in individual equalizers, better distribute the equalization function throughout the optical amplifier, and facilitate optical amplifiers with higher gain. These amplifiers can be used in communication systems that may, or may not, be employed to span a body of water 104. When used to span a body of water, amplifier 110 is often seated the on bottom 102 of the water and the input and output optical media span between beach landings. However, it will be appreciated that plural amplifier and optical media links may be disposed beneath the water.

Having described preferred embodiments of a novel extended band erbium doped fiber amplifier (which are intended to be illustrative and not limiting), it is noted that modifications and variations can be made by persons skilled in the art in light of the above teachings. For example, the optical amplifier may be achieved in any number of stages with an equalizer between stages. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims

What is claimed is:

1. An optical amplifier comprising:
a plurality of amplifier stages 1 . . . N, each of said plurality of stages 1 . . . N−1 including a pumped length of erbium doped fiber, said $N^{th}$ amplifier stage including an unpumped length of erbium doped fiber; and
a plurality of equalizers, each equalizer being coupled between each of said plurality of amplifier stages.

2. An optical amplifier having an input and an output, comprising:
a first, second and third amplifier stage;
a first equalizer coupled between the first and second amplifier stages;
a second equalizer coupled between the second and third amplifier stages;
a third equalizer coupled between the third amplifier stage and the output;
a pumped first length of erbium doped fiber, included in said first amplifier stage, coupled between the input and the first equalizer;
a pumped second length of erbium doped fiber, included in said second amplifier stage, coupled between the first equalizer and the second equalizer; and
an unpumped third length of erbium doped fiber, included in said third amplifier stage, coupled between the second equalizer and the third equalizer.

3. The amplifier of claim 1, wherein a first equalizer is an optical component that equalizes a spectral power density across a bandwidth at an output of the first equalizer.

4. The amplifier of claim 2, wherein the amplifier is characterized by a bandwidth that is greater than 45 nanometers over which the spectral power density is substantially flat.

5. The amplifier of claim 2, wherein the amplifier is characterized by a bandwidth that is greater than 60 nanometers over which the spectral power density is substantially flat.

6. The amplifier of claim 2, wherein the first, second and third amplifier stages combine to provide a combined gain performance that is greater than 13 dB with a noise figure of less than 4 dB.

7. The amplifier of claim 2, wherein the first, second and third amplifier stages combine to provide a combined gain performance that is greater than 13 dB with a noise figure of less than 4 dB across a band from 1530 nanometers through 1610 nanometers when stimulated with an input signal that is characterized by a power of substantially zero dBm distributed across the band.

8. The amplifier of claim 2, wherein the first, second and third amplifier stages combine to provide a combined gain performance that is greater than 13 dB and less than 17 dB at every wavelength in a band between 1530 nanometers and 1610 nanometers when stimulated with an input signal that is characterized by a power of substantially zero dBm distributed across the band.

9. The amplifier of claim 2, wherein:
   the first length of erbium doped fiber is a substantially 20 meter length of erbium doped fiber;
   the second length of erbium doped fiber is a substantially 20 meter length of erbium doped fiber;
   the third length of erbium doped fiber is a substantially 4.3 meter length of erbium doped fiber.

10. The amplifier of claim 2, further comprising an optical pump system, wherein the optical pump system pumps:
    the first length of erbium doped fiber with a substantially 480 milliwatt pump signal of a substantially 980 nanometer wavelength; and
    the second length of erbium doped fiber with a substantially 300 milliwatt pump signal of a substantially 980 nanometer wavelength.

11. The amplifier of claim 9, further comprising an optical pump system, wherein the optical pump system pumps:
    the first length of erbium doped fiber with a substantially 480 milliwatt pump signal of a substantially 980 nanometer wavelength; and
    the second length of erbium doped fiber with a substantially 300 milliwatt pump signal of a substantially 980 nanometer wavelength.

12. A system comprising:
    an input optical transmission medium;
    an output optical transmission medium; and
    an optical amplifier coupled therebetween, the optical amplifier including a plurality of amplifier stages 1 . . . N, the optical amplifier further including a plurality of equalizers, each equalizer being coupled between adjacent amplifier stages, wherein each of said plurality of amplifier stages 1 . . . N−1 includes a pumped length of erbium doped fiber and said last amplifier stage N includes an unpumped length of erbium doped fiber.

* * * * *

UNITED STATES PATENT AND TRADEMARK OFFICE
CERTIFICATE OF CORRECTION

PATENT NO. : 6,396,624 B1
DATED : May 28, 2002
INVENTOR(S) : Morten Nissov et al.

It is certified that error appears in the above-identified patent and that said Letters Patent is hereby corrected as shown below:

Column 3,
Line 40, please delete "FIG." and insert -- figure --.

Signed and Sealed this

Twenty-third Day of July, 2002

*Attest:*

*Attesting Officer*

JAMES E. ROGAN
*Director of the United States Patent and Trademark Office*